(12) United States Patent
Han et al.

(10) Patent No.: US 10,678,507 B2
(45) Date of Patent: Jun. 9, 2020

(54) PROGRAMMABLE MULTIPLY-ADD ARRAY HARDWARE

(71) Applicant: ALIBABA GROUP HOLDING LIMITED, George Town, Grand Cayman (KY)

(72) Inventors: Liang Han, San Mateo, CA (US); Xiaowei Jiang, San Mateo, CA (US)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/054,783

(22) Filed: Aug. 3, 2018

(65) Prior Publication Data

US 2019/0196788 A1    Jun. 27, 2019

Related U.S. Application Data

(60) Provisional application No. 62/610,052, filed on Dec. 22, 2017.

(51) Int. Cl.
| | | |
|---|---|---|
| *G06F 7/544* | (2006.01) | |
| *G06F 7/533* | (2006.01) | |
| *G06F 9/30* | (2018.01) | |
| *G06F 7/60* | (2006.01) | |
| *G06F 7/53* | (2006.01) | |
| *G06N 3/063* | (2006.01) | |

(52) U.S. Cl.
CPC .......... *G06F 7/5338* (2013.01); *G06F 7/5318* (2013.01); *G06F 7/544* (2013.01); *G06F 7/5443* (2013.01); *G06F 7/607* (2013.01); *G06F 9/30014* (2013.01); *G06F 9/30101* (2013.01); *G06N 3/063* (2013.01)

(58) Field of Classification Search
USPC ................................................. 708/620, 625
See application file for complete search history.

(56) References Cited

U.S. PATENT DOCUMENTS

| 9,465,578 | B2 * | 10/2016 | Tannenbaum ........ G06F 7/4876 |
| 2004/0139131 | A1 | 7/2004 | Guevokian et al. |
| 2005/0071413 | A1 | 3/2005 | Schulte et al. |
| 2006/0075012 | A1 * | 4/2006 | Minz ........................ G06F 7/57 708/490 |

OTHER PUBLICATIONS

PCT International Search Report dated Apr. 2, 2019, issued in corresponding International Application No. PCT/US2018/067317 (9 pgs.).

* cited by examiner

*Primary Examiner* — Tan V Mai
(74) *Attorney, Agent, or Firm* — Finnegan, Henderson, Farabow, Garrett & Dunner, LLP

(57) ABSTRACT

An integrated circuit including a data architecture including N adders and N multipliers configured to receive operands. The data architecture receives instructions for selecting a data flow between the N multipliers and the N adders of the data architecture. The selected data flow includes the options: (1) a first data flow using the N multipliers and the N adders to provide a multiply-accumulate mode and (2) a second data flow to provide a multiply-reduce mode.

14 Claims, 7 Drawing Sheets

(Multiply-Reduce Mode)

(Multiply-Accumulate Mode)

*(Multiply-Reduce Mode)*

*(Multiply-Accumulate Mode)*

PROGRAMMABLE MULTIPLY-ADD ARRAY HARDWARE

CROSS REFERENCE TO RELATED APPLICATION

The present application is based on and claims benefit of priority to Provisional Application No. 62/610,052, filed Dec. 22, 2017, the entire contents of which are incorporated herein by reference.

BACKGROUND

With the exponential growth of neural network based deep learning applications across various business units, the commodity Central Processing Unit/Graphics Processing Unit (CPU/GPU) based platform is no longer a suitable computing substrate to support the ever-growing computation demands in terms of performance, power efficiency and economic scalability. Developing neural network processors to accelerate neural-network-based deep-learning applications has gained significant traction across many business segments, including established chip makers, start-up companies as well as large Internet companies. Single Instruction Multiple Data (SIMD) architecture can be applied to chips to accelerate calculations for applications of deep learning.

Neural network algorithms generally require large matrix multiplication accumulation operations. Accordingly, accelerating hardware generally requires large-scale parallel multiply-accumulation structures to speed up the acceleration. However, area and power cost needs of such structures must be controlled to optimize computational speed of the hardware and reduce size of the number of chips to economize on power consumption.

SUMMARY

Embodiments of the present disclosure provide an architecture of a software programmable connection between a multiplier array and an adder array to enable reusing of the adders to perform either multiply-accumulate or multiply-reduce. As compared to conventional solutions, this architecture is more area- and power- efficient, which is important for neural network processing units where a substantial number of data lanes are implemented.

Embodiments of the present disclosure provide a method for specifying functionalities to be performed on a data architecture including N adders and N multipliers configured to receive operands is disclosed. The method comprising receiving instructions for the data architecture to operate in one of a multiply-reduce mode or a multiply-accumulate mode, and selecting, based on the instructions, a data flow between the N multipliers and at least some of the N adders of the data architecture.

Furthermore, the embodiments of the present disclosure include an integrated circuit. The integrated circuit includes a data architecture including N adders and N multipliers configured to receive operands. The data architecture receives instructions for selecting a data flow between the N multipliers and the N adders of the data architecture. The selected data flow includes the options: (1) a first data flow using the N multipliers and the N adders to provide a multiply-accumulate mode and (2) a second data flow to provide a multiply-reduce mode.

Moreover, the embodiments of the present disclosure include a non-transitory computer-readable storage medium that stores a set of instructions that is executable by at least one processor of a device to cause the device to perform the aforementioned method.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
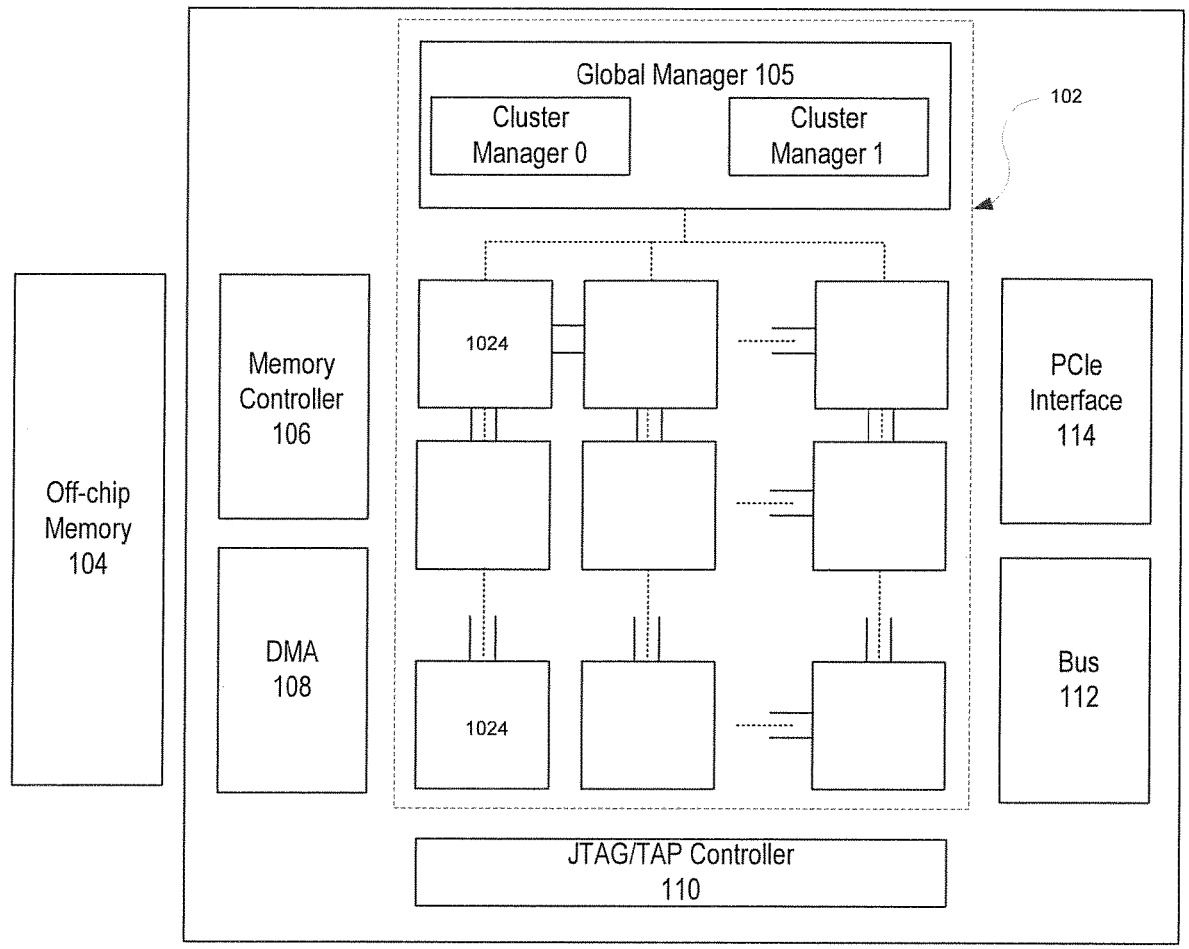
FIG. 1 illustrates an exemplary neural network processing unit chip architecture, consistent with embodiments of the present disclosure.

The embodiments of the present disclosure may be implemented in a Neural Network Processing Unit (NPU) architecture, such as the exemplary NPU architecture 100 illustrated in FIG. 1, to accelerate deep learning algorithms.

FIG. 1 illustrates an exemplary architecture 100, according to embodiments of the disclosure. As shown in FIG. 1, architecture 100 can include an on-chip communication system 102, an off-chip memory 104, a memory controller 106, a direct memory access (DMA) unit 108, a Joint Test Action Group (JTAG)/Test Access End (TAP) controller 110, a bus 112, a peripheral interface 114, and the like. It is appreciated that, on-chip communication system 102 can perform arithmetic operations based on communicated data packets.

Chip communication system 102 can include a global manager 105 and a plurality of tiles 1024. Global manager 105 can include at least one cluster manager to coordinate with tiles 1024. For example, each cluster manager can be associated with an array of tiles that provide synapse/neuron circuitry for the neural network. For example, the top layer of tiles of FIG. 1 may provide circuitry representing an input layer to neural network, while the second layer of tiles may provide circuitry representing a hidden layer of the neural network. As shown in FIG. 1, global manager 105 can include two cluster managers to coordinate with two arrays of tiles. Tiles 1024 can include SIMD architecture including one or more multipliers, adders, multiply-accumulators and are configured to perform one or more operations (e.g., arithmetic calculation) on the communicated data packets under the control of global manager 105. To perform the operation on the communicated data packets, tiles 1024 can include at least one core for processing the data packets and at least one buffer for storing the data packets.

Off-chip memory 104 can include read-only memory (ROM), erasable programmable read-only memory (EPROM) or the like. Off-chip memory 104 can be configured to store a large amount of data with slower access speed, compared to the on-chip memory integrated with one or more processor.

Memory controller 106 can read, write, or refresh one or more memory devices. The memory devices can include the on-chip memory and the off-chip memory. For example, the memory device can be implemented as any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, or a magnetic or optical disk.

DMA unit 108 can generate memory addresses and initiate memory read or write cycles. DMA unit 108 can contain several hardware registers that can be written and read by the one or more processor. The registers can include a memory address register, a byte-count register, and one or more control registers. These registers can specify some combination of the source, the destination, the direction of the transfer (reading from the input/output (I/O) device or writing to the I/O device), the size of the transfer unit, and/or the number of bytes to transfer in one burst.

JTAG/TAP controller 110 can specify a dedicated debug port implementing a serial communications interface (e.g., a JTAG interface) for low-overhead access without requiring direct external access to the system address and data buses. The JTAG/TAP controller 110 can also specify an on-chip test access interface (e.g., a TAP interface) that implements a protocol to access a set of test registers that present chip logic levels and device capabilities of various parts.

Bus 112 can include intra-chip bus and inter-chip bus. The intra-chip bus can connect all the internal components of NPU architecture 100, such as on-chip communication system 102, off-chip memory 104, memory controller 106, DMA unit 108, JTAG/TAP controller 110, and PCIe interface 114 to each other.

Peripheral interface 114 (such as a PCIe interface) can support full-duplex communication between any two endpoints, with no inherent limitation on concurrent access across multiple endpoints.

Figure 2:
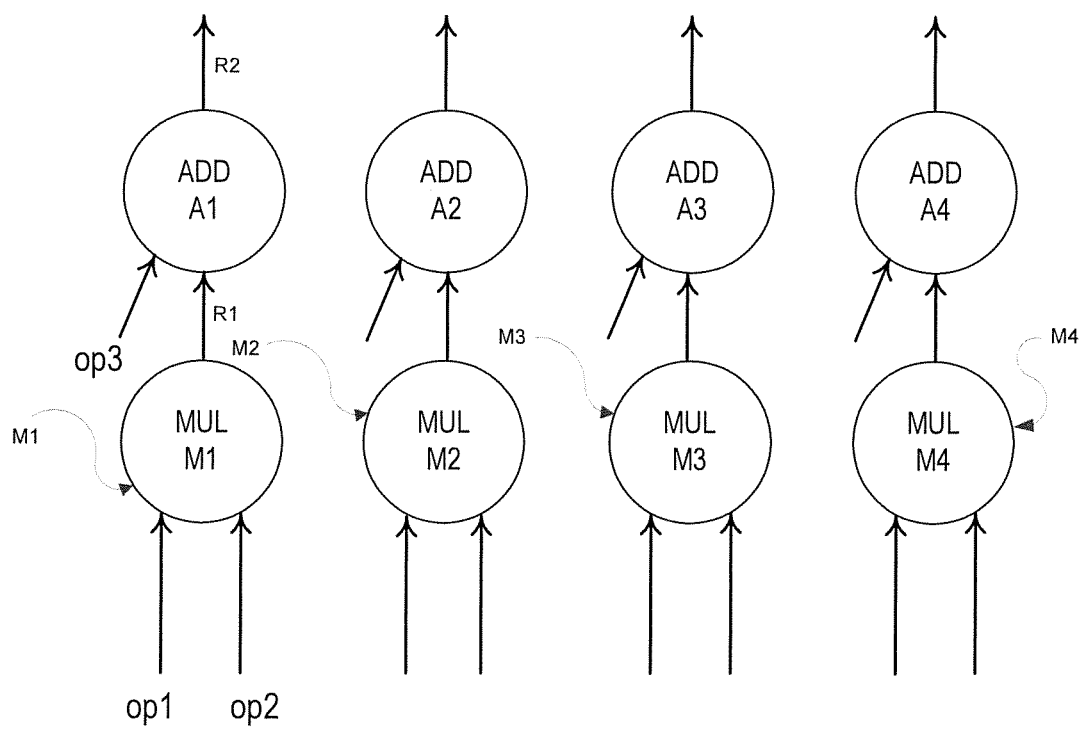
FIG. 2 illustrates an exemplary architecture of a Multiply-Add array with 4 lanes in parallel.

In a computer with a Single Instruction Multiple Data (SIMD) architecture, each of the parallel multiple processing units, Arithmetic Logic Units (ALUs) or small CPUs, compute simultaneously with their own data—generally 2 or 3 input operands and 1 output result. For example, a multiply-add array is common in a SIMD architecture, where each data lane may own a private multiplier and adder. The private multiplier and adder enable different data flows being processed in parallel. FIG. 2 illustrates an exemplary architecture of a multiply-add array with 4 lanes in parallel, wherein the array comprises of four multipliers M1-M4 and four adders A1-A4. It should be noted that figures in the present disclosure will be illustrated with a 4-way SIMD, but the 4-way SIMD concept is scalable to be narrower or wider than 4 lanes.

As illustrated in FIG. 2, two operands are inputted to each multiplier, viz., M1-M4. For simplicity, operands op1 and op2 are inputted into multiplier M1, which generates result R1. Result R1 of the multiplication of operands op1 and op2 is inputted to adder A1, which also receives as input operand op3 to generate result R2. Result R2 of the addition of operand op3 and result R1 can proceed for further processing (not shown). The above operations can be summarized as follows:

$$R2=[(op1*op2)=R1]+op3.$$

Simultaneous to the above operations, other operands are inputted to the other multipliers illustrated in FIG. 2 and results from each other multiplier is inputted to the other adders along with other operands, the results of which proceed for further processing (not shown).

Figure 3:
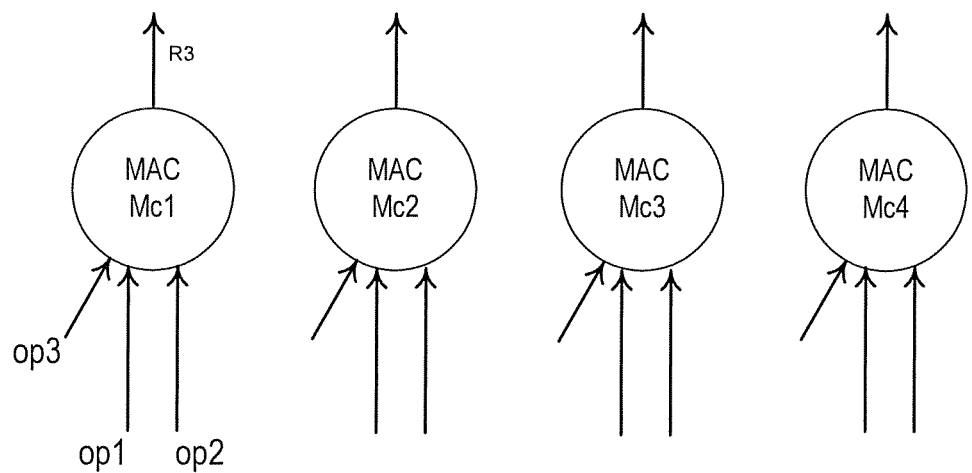
FIG. 3 illustrates an exemplary architecture of a multiply-accumulator (MAC) unit design.

Some optimized designs may fuse the multiplier and adder into one multiply-accumulator (MAC) unit to save area. FIG. 3 illustrates an exemplary architecture of a MAC unit design comprising four MAC units Mc1-Mc4. As illustrated in FIG. 3, three operations are inputted to each MAC unit. For simplicity, operands op1, op2, and op3 are illustrated in FIG. 3, where operand op1 is multiplied to operand op2 and the result is added to operand op3. Result, for example R3, proceeds for further processing (not shown).

Simultaneous to the above operations, other operands are inputted to the other MAC units illustrated in FIG. 3 and results from each other MAC unit proceed for further processing (not shown). The operations of FIG. 3 are similar to the operations of FIG. 2, except there is just one layer of components, viz. MAC units Mc1-Mc4 rather than a two-layer setup illustrated in FIG. 2, where the first layer comprises multipliers M1-M4 and the second layer comprises adders A1-A4.

It should be noted that the implementations illustrated in FIGS. 2 and 3, however, can only handle data within private lanes in parallel. That is, there is no cross-lane data processing ability. Further, in some neural networks, large matrix multiply-add operations are very common. Such operations need to be mapped into big but not-that-wide parallel hardware in an efficient way. Accordingly, accumulation operations across multiple SIMD lanes can become important for performance. To enable a faster reduce add accumulation operation from different SIMD lanes, an adder tree is generally introduced after the multiplier arrays.

Figure 4:
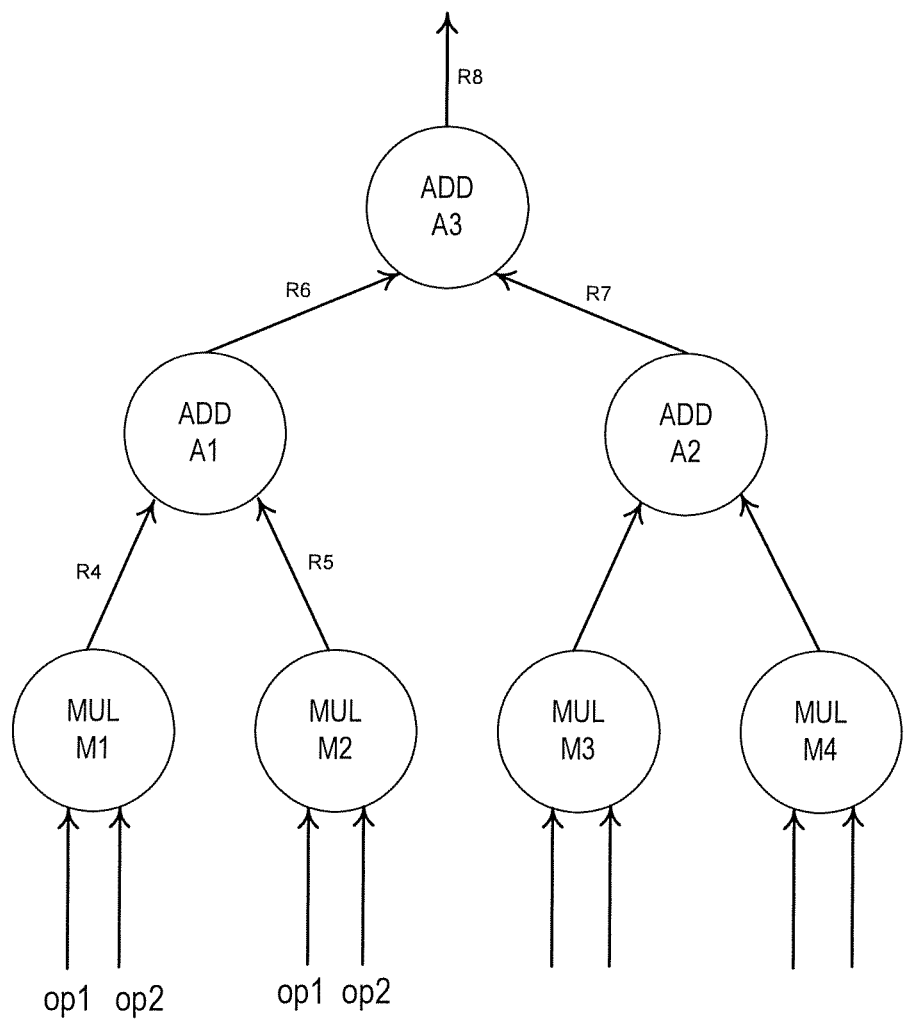
FIG. 4 illustrates an exemplary architecture of parallel multipliers followed by a reduce-adder tree.

FIG. 4 illustrates an exemplary architecture of parallel multipliers followed by a reduce-adder tree. In operation, a pair of operands is inputted to each of the multipliers, for example M1-M4. For simplicity, operands op1 and op2 are shown as inputs to multiplier M1 and operands op1 and op2 are shown as inputs to multiplier M2, though it is readily understood that other pairs of operands can be simultaneously inputted to the other multipliers M3-M4. Further, even though operands op1 and op2 are shown as inputs to both multipliers M1 and M2, operands op1 and op2 may be different from each other (and by extension to operands inputted to the other multipliers M3-M4). The difference may be in their identification and the type and kind of data flowing through the inputs.

Result R4 of the multiplication of operands op1 and op2 is added to result R5 of the multiplication of operands op1 and op2 at adder A1 to generate result R6. Result R6 is added to a result R7 (from adder A2) at adder A3 to generate result R8. Result R8 proceeds for further processing (not shown).

Adders A1-A3 form a reduce-adder tree and there is one less adder in this tree than the architecture illustrated in FIG. 2, but the number of levels, viz., level 1 comprising M1-M4, level 2 comprising A1-A2, and level 3 comprising A3, have increased from the levels illustrated in FIG. 2, where there are 2 levels, viz., level 1 comprising M1-M4 and level 2 comprising A1-A4. Even though the levels in FIG. 4 have increased, the architecture produces a single result (e.g., result R8) using a plurality of multipliers and an adder tree, whereas the architecture illustrated in FIG. 2 produces four disparate or parallel results.

Figure 5:
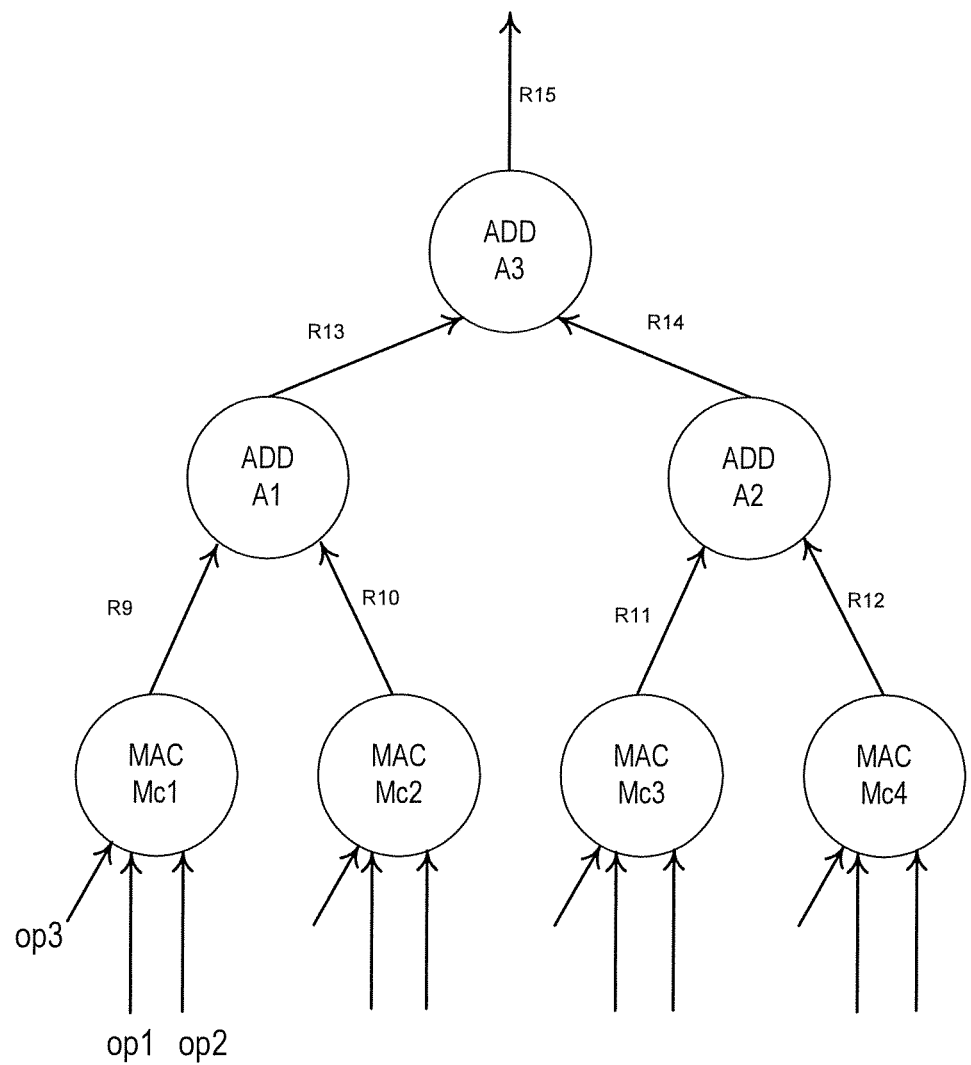
FIG. 5 illustrates an exemplary architecture of mapping an algorithm that often requires accumulation ability both in individual data lane and across the lanes.

In fact, the mapping architectures illustrated in FIGS. 2, 3, and 4 often require an ability to accumulate both in an individual data lane and across the lanes. For example, FIG. 5 illustrates an example of such an architecture providing parallel MAC layer followed by a reduce-adder tree. In operation, a triplet of operands is inputted to each of the MAC units in layer 1. The result from each of the MAC units is inputted into the reduce-adder tree. For example, operands op1, op2, and op3 are inputted in MAC unit Mc1 for generating result R9. Other triplets of operands are inputted to each of the MAC units Mc2-Mc4 to generate results R10, R11, and R12, respectively. Result R9 (from MAC unit Mc1) is inputted along with result R10 (from MAC unit Mc2) to adder A1 to generate R13. Similarly, result R11 (from MAC unit Mc3) is inputted along with result R12 (from MAC unit Mc4) to adder A2 to generate R14. Adder A3 receives results R13 and R14 as operands to generate result R15, which proceeds for further processing (not shown).

The embodiments of the present disclosure provide a programmable multiply-add array hardware. For example, the embodiments describe the ability to select a data flow between a multiplier array and an adder array to enable reusing of the adders to perform either multiply-accumulate or multiply-reduce-add. Accordingly, the architecture provides more area- and power-efficiency than alternative solutions.

Moreover, while the embodiments are directed to a neural network processing unit, it is appreciated that the embodiments described herein could be implemented by any SIMD architecture hardware with cross-lane data processing ability, especially accelerators for deep learning. This includes SIMD architecture hardware dedicated on Neural Network Processing Units and FPGAs, as well as upgraded GPUs and DSPs stretching towards a deep learning market.

Figure 6A:
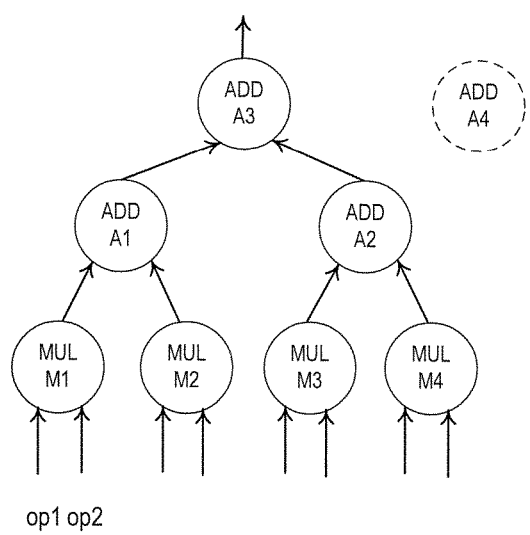
FIGS. 6A and 6B illustrate exemplary architectures of a multiply-add array, consistent with embodiments of the present disclosure.
Figure 6B:
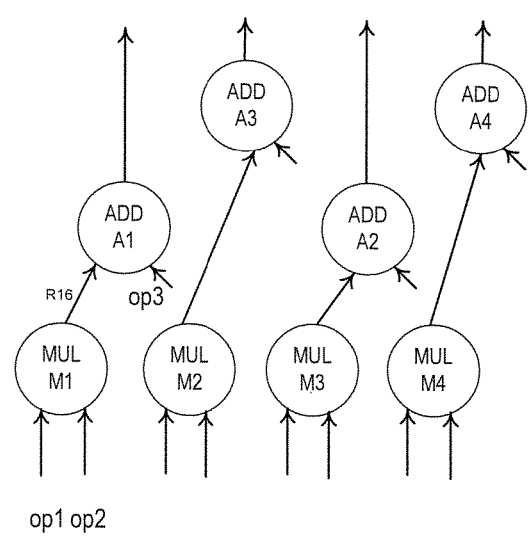

FIGS. 6A and 6B illustrate an exemplary architecture of a multiply-add array 600 programmable to perform multiply-accumulate and multiply-reduce modes, consistent with embodiments of the present disclosure. As illustrated in FIGS. 6A and 6B, adders A1-A4 are reused in the multiply-reduce mode (FIG. 6A) and the multiply-accumulate mode (FIG. 6B).

In operation and as illustrated in FIG. 6A, adder A4 is disconnected from the data flow while adders A1-A3 are connected to perform a multiply-reduce operation. In the illustration, multiplier M1 takes two operands op1 and op2 to generate an output operand to adder A1. Multipliers M2, M3, and M4 are similarly equipped to operate the same as M1 and provide output operands to their corresponding adders. For example, multipliers M1 and M2 provide output operands to adder A1, while multipliers M3 and M4 provide output operands to adder A2. Adders A1 and A2 can add their incoming operands and provide output operands to adder A3.

To perform a parallel multiply-accumulate operation, as illustrated in FIG. 6B, a data flow includes each adder A1-A4 being connected to a corresponding multiplier. Multiplier M1 takes two operands op1 and op2 to generate result operand R16. Result operand R16 and operand op3 are provided as operands to adder A1. The result from A1 may proceed onwards to another array (not shown). Similarly, multipliers M2-M4 take a set of operands and the resulting operand from each of M2-M4 is inputted to adders A3, A2, and A4, respectively, as a first operand to A3, A2, and A4, respectively. Each of A2-A4 takes a second operand and the resulting operands may proceed onwards to other arrays (not shown).

The disclosed embodiments provide a software controllable data flow between the multiplier array and the adder array to perform in either mode. One way to instruct hardware for selecting the data flow through the multipliers and adders is via a compiler for generating different instructions for different desired operations. For example, to perform D=OP1*OP2+OP3, the compiler could generate the following instructions:

r0=LOAD Mem[&OP1];
r1=LOAD Mem[&OP2];
r2=LOAD Mem[&OP3];
r3=MUL r0, r1;
r3=ADD r3, r2;
STORE Mem[&D], r3.

The compiled code can include information to control multiplexers and registers for navigating the data flow for each of the modes. The multiplier array, the adder array, the multiplexers, and registers can be incorporated into each tile (e.g., tile 1024 of architecture 100 of FIG. 1). Each tile can receive instructions (in some cases, on a cycle by cycle basis) from a cluster manager for specifying the functionalities to be performed on the SIMD architecture within tile 1024. Depending on the instructions received from the cluster manager, the SIMD architectures across the various tiles can be independent of each other and thereby operate in the same operating mode or in different operating modes.

After receiving an instruction from the cluster manager, the tile's core can issue operating-mode instructions into an instruction buffer of the tile for specifying the functionalities to be performed on the SIMD architecture. These specified functionalities can result in a data flow corresponding to the multiply-reduce mode (as illustrated in FIG. 6A) or a data flow corresponding to the multiply-accumulate mode (as illustrated in FIG. 6B).

As illustrated in FIGS. 6A and 6B, for a SIMD architecture, the present disclosure uses N multipliers and N adders across both multiply-reduce and multiply-accumulate modes. It is appreciated that he SIMD architecture can be an N-way SIMD architecture having N multiplier and N adders or can include adders and multipliers other than the N multipliers and N adders (e.g., these other adders and multipliers may not be active). One skilled in the arts will appreciate that the embodiments provided in present disclosure are more area- and power-efficient. This efficiency is important for neural network processing units, where several thousand data lanes may be implemented. The embodiments in the present disclosure are more area and power-efficient than the implementation of FIG. 2, which would require N multipliers and 2N−1 adders, with at least another two layers of adders on top of adders A1-A4. That is, the outputs of adders A1 and A2 would be inputted as operands to a fifth adder, while the outputs of adders A3 and A4 would be inputted as operands to sixth adder. And the outputs of the fifth and sixth adders would be inputted as operands to a seventh adder. Moreover, the present disclosure is more area and power-efficient than the implementation of FIG. 4, which would require N MACs (a fused multiplier and adder) and N−1 adders.

Figure 7:
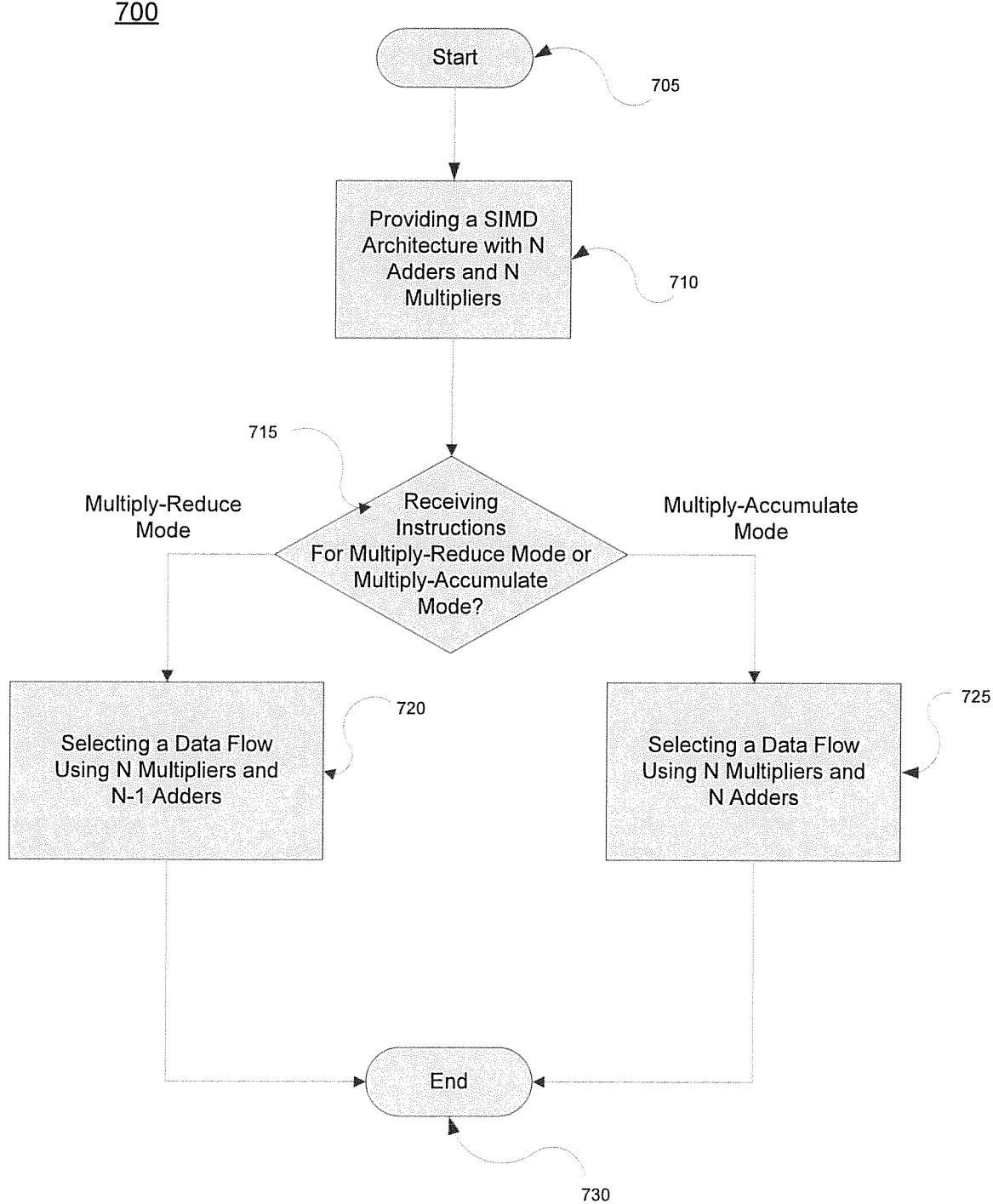
FIG. 7 illustrates an exemplary method for specifying functionalities to be performed on a data architecture, consistent with embodiments of the present disclosure.

FIG. 7 illustrates an exemplary method 700 for specifying functionalities to be performed on an data architecture, consistent with embodiments of the present disclosure. The method can be performed by, for example, an NPU architecture (e.g., NPU architecture 100 illustrated in FIG. 1). For example, components of the NPU architecture (such as global manager 105, cluster manager, tile 1024, or any combination thereof) can assist with performing method 700.

After initial start step 705, at step 710, a SIMD architecture is provided with N multipliers and N adders. The N multipliers are configured to receive two incoming operands, while the N adders are configured to provide an operation on the two incoming operands.

At step 715, the SIMD architecture receives instructions corresponding to a multiply-reduce mode or a multiply-accumulate mode. For example, as stated above, the instructions can specify the functionalities to be performed on the SIMD architecture.

At step 720, if the instructions correspond to a multiply-reduce mode, the SIMD architecture selects a data flow to provide the multiply-reduce functionality (e.g., shown in FIG. 6A). In particular, the multiply-reduce data flow uses a set of connections involving N multipliers and N–1 adders, where one of the adders is not used. For example, as shown in FIG. 6A, adder A4 is disconnected while adders A1-A3 are connected to perform a multiply-reduce operation. In the illustration, multiplier M1 takes two operands op1 and op2 to generate an output operand to adder A1. Multipliers M2, M3, and M4 are similarly equipped to operate the same as M1 and provide output operands to their corresponding adders. For example, multipliers M1 and M2 provide output operands to adder A1, while multipliers M3 and M4 provide output operands to adder A2. Adders A1 and A2 can add their incoming operands and provide output operands to adder A3.

At step 725, if the instructions correspond to a multiply-accumulate mode, the SIMD architecture selects a data flow to provide the multiply-accumulate functionality (e.g., shown in FIG. 6B). In particular, the multiply-accumulate data flow uses a set of connections involving N multipliers and N adders. For example, as shown in FIG. 6B, each adder A1-A4 is connected after a multiplier. Multiplier M1 takes two operands op1 and op2 to generate result operand R16. Result operand R16 and operand op3 are provided as operands to adder A1. The result from A1 may proceed onwards to another array (not shown). Similarly, multipliers M2-M4 take a set of operands and the resulting operand from each of M2-M4 is inputted to adders A3, A2, and A4, respectively, as a first operand to A3, A2, and A4, respectively. Each of A2-A4 takes a second operand and the resulting operands may proceed onwards to other arrays (not shown).

After steps 720 or 725, method 700 may end at 730. It is appreciated that the SIMD architecture can operate in its instructed mode until the SIMD architecture receives a configuration instruction that changes the mode.

It is appreciated that a global manager of the NPU architecture could use software to control the configuration of the SIMD architecture described above. For example, the global manager may send instructions to the tiles or cores to change the configuration mode of the multipliers and adders. The software may be stored on a non-transitory computer readable medium. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

The invention claimed is:

1. A method for specifying functionalities to be performed on a data architecture including N adders and N multipliers configured to receive operands, the method comprising:
   receiving instructions for the data architecture to operate in one of a multiply-reduce mode or a multiply-accumulate mode, wherein the N multipliers and at least some of the N adders of the data architecture are used both in the multiply-reduce mode and the multiply-accumulate mode; and
   selecting, based on the instructions, a data flow between the N multipliers and the at least some of the N adders of the data architecture,
   wherein the N multipliers includes a first multiplier of which output data is provided to a first adder among the at least some of the N adders in the multiply-reduce mode and to a second adder among the at least some of the N adders in the multiply-accumulate mode.

2. The method of claim 1, wherein selecting the data flow includes, in response to receiving instructions corresponding to the multiply-reduce mode, selecting a first data flow using the N multipliers and N–1 adders, wherein one of the N adders is not used.

3. The method of claim 2, wherein the first data flow comprises the N–1 adders receiving input resulting from the N multipliers.

4. The method of claim 1, wherein selecting the data flow includes, in response to receiving instructions corresponding to the multiply-accumulate mode, selecting a second data flow using the N multipliers and the N adders.

5. The method of claim 4, wherein the second data flow comprises each adder of the N adders receiving an input operand from a corresponding multiplier of the N multipliers.

6. An integrated circuit comprising:
   a data architecture including N adders and N multipliers configured to receive operands, wherein the data architecture receives instructions for selecting a data flow between the N multipliers and at least some of the N adders of the data architecture, the selected data flow including the options:
   a first data flow using the N multipliers and the N adders to provide a multiply-accumulate mode; and
   a second data flow to provide a multiply-reduce mode,
   wherein the N multipliers and the at least some of the N adders are used both in the first data flow and the second data flow, and
   wherein the N multipliers includes a first multiplier of which output data is provided to a first adder among the at least some of the N adders in the first data flow and to a second adder among the at least some of the N adders in the second data flow.

7. The integrated circuit of claim 6, wherein the first data flow uses each adder of the N adders to receive an input operand from a corresponding multiplier of the N multipliers.

8. The integrated circuit of claim 6, wherein the second data flow uses the N multipliers and N−1 adders, wherein one of the N adders is not used.

9. The integrated circuit of claim 8, wherein the second data flow uses the N−1 adders to receive input resulting from the N multipliers.

10. A non-transitory computer-readable storage medium that stores a set of instructions that is executable by at least one processor of a device to cause the device to perform a method for specifying functionalities to be performed on a data architecture including N adders and N multipliers configured to receive operands, the method comprising:
   receiving instructions for the data architecture to operate in one of a multiply-reduce mode or a multiply-accumulate mode, wherein the N multipliers and at least some of the N adders of the data architecture are used both in the multiply-reduce mode and the multiply-accumulate mode; and
   selecting, based on the instructions, a data flow between the N multipliers and the at least some of the N adders of the data architecture,
   wherein the N multipliers includes a first multiplier of which output data is provided to a first adder among the at least some of the N adders in the multiply-reduce mode and to a second adder among the at least some of the N adders in the multiply-accumulate mode.

11. The non-transitory computer-readable storage medium of claim 10, wherein selecting the data flow includes, in response to receiving instructions corresponding to the multiply-reduce mode, selecting a first data flow using the N multipliers and N−1 adders, wherein one of the N adders is not used.

12. The non-transitory computer-readable storage medium of claim 11, wherein the first data flow comprises the N−1 adders receiving input resulting from the N multipliers.

13. The non-transitory computer-readable storage medium of claim 10, wherein selecting the data flow includes, in response to receiving instructions corresponding to the multiply-accumulate mode, selecting a second data flow using the N multipliers and the N adders.

14. The non-transitory computer-readable storage medium of claim 13, wherein the second data flow comprises each adder of the N adders receiving an input operand from a corresponding multiplier of the N multipliers.

* * * * *